W. H. D. FORD.
SPRING TENSION GAGE.
APPLICATION FILED DEC. 23, 1919.
1,383,713.
Patented July 5, 1921.
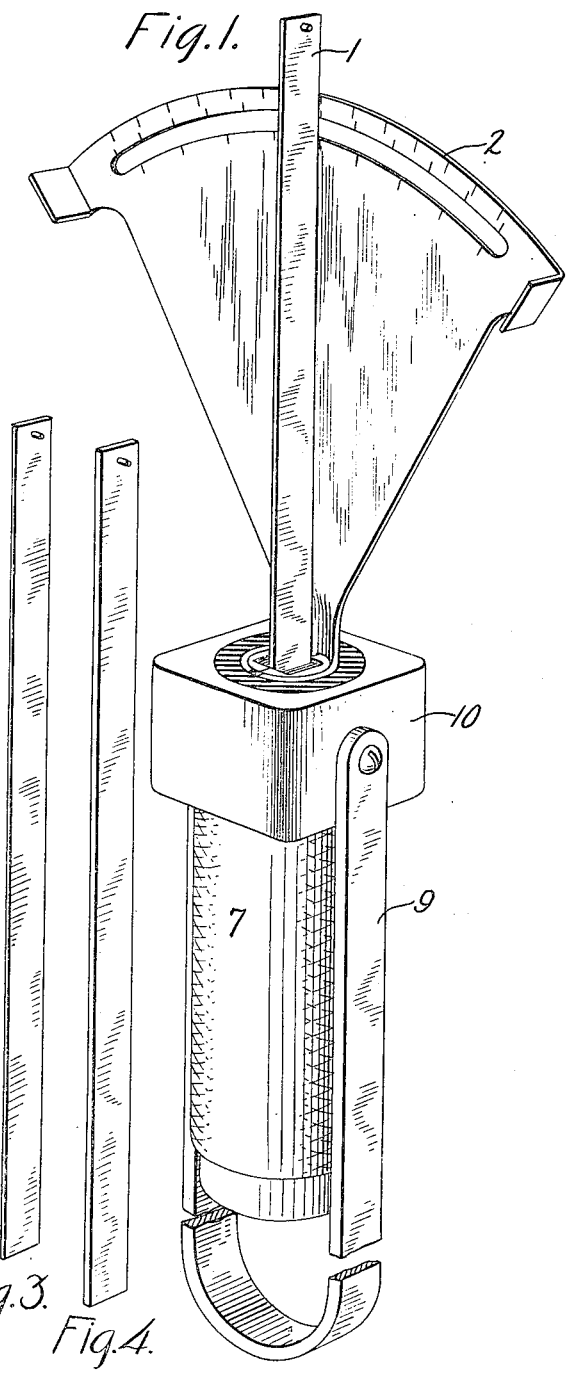
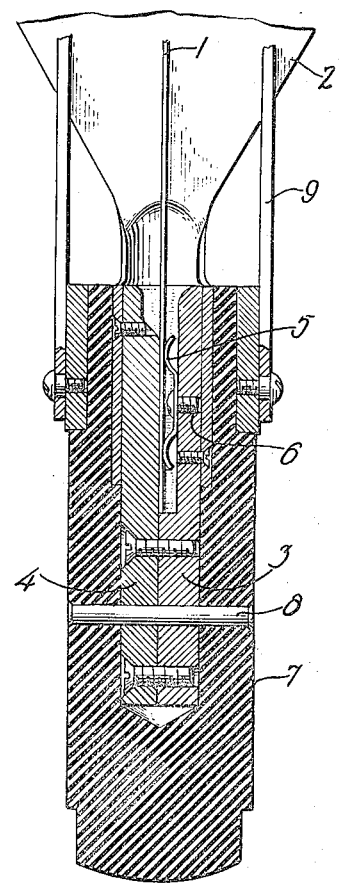
Inventor:
William H. D. Ford.
by Joel Ch. Palmer
Att'y.

UNITED STATES PATENT OFFICE.

WILLIAM H. D. FORD, OF NEW YORK, N. Y., ASSIGNOR TO WESTERN ELECTRIC COMPANY, INCORPORATED, OF NEW YORK, N. Y., A CORPORATION OF NEW YORK.

SPRING-TENSION GAGE.

1,383,713.  Specification of Letters Patent.  Patented July 5, 1921.

Application filed December 23, 1919. Serial No. 346,880.

*To all whom it may concern:*

Be it known that I, WILLIAM H. D. FORD, a citizen of the United States, residing at New York, in the county of New York, State of New York, have invented certain new and useful Improvements in Spring-Tension Gages, of which the following is a full, clear, concise, and exact description.

This invention relates to measuring instruments and more particularly to gages for measuring the tension of contact springs.

The object of this invention is the provision of a gage for measuring contact pressure of contact springs such as are used on relays and other electrical apparatus.

The basic feature of this invention comprises the combination of a flexible reed of spring steel or other suitable material, a base, to which one end of said flexible reed is secured and a calibrated scale by which the deflections of the flexible reed are measured.

Another feature of this invention comprises means by which reeds of various thicknesses can be readily inserted and withdrawn from the base, thereby making possible the accurate reading of a much wider range of spring tensions than would be practicable with a gage having a non-interchangeable reed.

Referring to the drawings, Figure 1 is a perspective view of the gage; Fig. 2 is a longitudinal section of the base showing the means whereby the flexible reeds are retained in place; and Figs. 3 and 4 are reeds of different thicknesses which can be interchangeably inserted in the base. In Figs. 1 and 2, 1 is a flexible reed, 2 is a calibrated scale, 3 and 4 are members forming the base, 5 is a spring secured to base member 3 by screw 6, 7 is a handle of rubber or other suitable material into which the base is inserted and to which it is secured by the rivets 8, 9 is a guard band for protecting the reed when the gage is not in use, and 10 is a metal head attached to the handle 7 to which the guard band 9 is pivotally attached.

The reed is normally in line with the middle calibrations of the scale and may be flexed to either side of the middle or zero position. In operation, the end of the reed is inserted between two contact springs of a relay or other apparatus, and first one contact spring and then the other is pulled away from its associated spring and the readings of the gage noted for each spring. The smaller reading as noted by the gage is the measure of the contact pressure. In the operation of measuring the contact pressure between a pair of coöperating contact springs, the reed is flexed first to one side of its normal position and then to the other side. Thus it will be seen that it is not necessary to reverse the gage in order to measure the tension of both of a pair of contact springs.

Three rows of calibrations are shown on scale 2 of Fig. 1, there being a separate row of calibrations provided for each reed.

As will be clear from Fig. 2, the reeds are inserted in a recess in the base and held between base members 4 and spring 5.

When the gage is in use the guard band 9 is swung down into the position shown in Fig. 1, and when the gage is not in use the guard band is swung up in the position shown in Fig. 2 where it acts as a protection to the flexible reed.

What is claimed is:

1. A tension gage comprising a base, a calibrated scale mounted on said base, flexible reeds of different thicknesses adapted to coöperate with said scale, and self-adjusting means in said base whereby said reeds may be individually secured thereto.

2. A tension gage comprising a plurality of interchangeable flexible reeds, a base into which said reeds, individually, can be inserted, means provided in said base for retaining the reed inserted therein and a calibrated scale coöperating with such inserted reed.

3. A tension gage comprising a base having a recess, a spring member in said recess, a flexible reed inserted in said recess and held therein by said spring member, and a calibrated scale attached to said base and coöperating with said flexible reed.

In witness whereof I hereunto subscribe my name this 19th day of December, A. D. 1919.

WILLIAM H. D. FORD.